(12) United States Patent
Biazetti et al.

(10) Patent No.: US 10,079,723 B2
(45) Date of Patent: Sep. 18, 2018

(54) DYNAMIC HIGH AVAILABILITY POLICY CREATION BASED UPON ENTRIES IN A CONFIGURATION MANAGEMENT DATABASE (CMDB) AND A BEST PRACTICES TEMPLATE

(75) Inventors: Ana C. Biazetti, Cary, NC (US); Thomas Lumpp, Reutlingen (DE); Juergen Schneider, Althengstet (DE)

(73) Assignee: International Business Machines Corporation, Armonk, NY (US)

( * ) Notice: Subject to any disclaimer, the term of this patent is extended or adjusted under 35 U.S.C. 154(b) by 1170 days.

(21) Appl. No.: 12/347,108

(22) Filed: Dec. 31, 2008

(65) Prior Publication Data
US 2010/0169860 A1   Jul. 1, 2010

(51) Int. Cl.
*H04L 12/24* (2006.01)

(52) U.S. Cl.
CPC ........ *H04L 41/0856* (2013.01); *H04L 41/085* (2013.01); *H04L 41/0806* (2013.01); *H04L 41/0843* (2013.01); *H04L 41/0893* (2013.01)

(58) Field of Classification Search
CPC ............. G06F 11/0709; G06F 11/0781; H04L 41/0806; H04L 41/085; H04L 41/0893
USPC ................... 714/4.11, 13; 709/220, 223, 227
See application file for complete search history.

(56) References Cited

U.S. PATENT DOCUMENTS

| | | | |
|---|---|---|---|
| 6,038,677 A | 3/2000 | Lawlor et al. | |
| 6,847,970 B2* | 1/2005 | Keller et al. | |
| 7,039,827 B2* | 5/2006 | Meyer et al. | 714/4.11 |
| 7,228,453 B2* | 6/2007 | O'Brien et al. | 714/13 |
| 7,721,152 B1* | 5/2010 | Joshi et al. | 714/25 |
| 7,797,566 B2* | 9/2010 | Dror et al. | 714/4.11 |
| 8,151,077 B1* | 4/2012 | Bauer | G06F 12/0802 711/118 |
| 2004/0143654 A1* | 7/2004 | Poirot et al. | 709/223 |
| 2005/0071449 A1* | 3/2005 | Alex et al. | 709/223 |
| 2006/0195448 A1* | 8/2006 | Newport | 707/8 |

* cited by examiner

*Primary Examiner* — Joseph R Kudirka
(74) *Attorney, Agent, or Firm* — Steven M. Greenberg, Esq.; CRGO Law

(57) ABSTRACT

A method for dynamically creating a high availability policy based upon entries in a configuration management database (CMDB) and a best practices template can be provided. The method can include directing resource discovery in a CMDB for a selected application to discover components and dependencies of the selected application. The method also can include mapping the components and dependencies discovered for the selected application in the CMDB to a best practices template specifying a parameterized high availability topology for the selected application. Finally, the method can include storing the best practices template with mapped components and dependencies as a high availability policy for the selected application.

12 Claims, 2 Drawing Sheets

DYNAMIC HIGH AVAILABILITY POLICY CREATION BASED UPON ENTRIES IN A CONFIGURATION MANAGEMENT DATABASE (CMDB) AND A BEST PRACTICES TEMPLATE

BACKGROUND OF THE INVENTION

The present invention broadly relates to the field of cluster configuration for high availability computing and more particularly the present invention relates to the field high availability policy creation for cluster management.

Computing clusters have become common in the field of high-availability and high-performance computing. Cluster-based systems exhibit three important and fundamental characteristics or properties: reliability, availability and serviceability. Each of these features is of paramount importance when designing a robust clustered system. Generally, a clustered system consists of multiple servers or server instances grouped together in a server farm of one or more server computing nodes that are connected over high-speed network communicative linkages. Each server process in the cluster can enjoy access to memory, possibly disk space and the facilities of a host operating system.

When building a highly available application, systems administrators are faced with the challenge of understanding all infrastructure components supporting the operation of the application. Those components include the servers, storage and middleware of the cluster and their operational dependencies. To achieve a highly available environment, it is required to configure a redundant system, and to observe and maintain highly available services supporting the system. This remains true not only for the initial configuration of the cluster, but also for subsequent changes to the configuration of the cluster. Thus, ably configuring a cluster to support the operation of a highly available application requires having a deep knowledge on the part of the administrator both of the use of high availability tools, most notably cluster managers, and also the configuration of the cluster managers to enable cost efficient and valuable high availability configurations.

Generally, cluster managers are configured through high availability policies, as it is well-known in the art, which policies include the definition of resource groups, start/stop sequences, backup alternatives and placement rules. A resource group lists all the resources necessary to render an application or component highly available such that the application can be properly restarted/moved to another host environment in case of failure.

The specification of a high availability policy for a highly available application solution, however, requires tedious manual intervention by those trained with the necessary knowledge of the operation and configuration of the cluster manager as well as deep knowledge of the components and sub components and dependencies of the application that are to be rendered highly available. Some attempts at automating the process of creating a high availability policy are evident in the art, for instance, within U.S. Pat. No. 6,038, 677 to Lawlor et al. for AUTOMATIC RESOURCE GROUP FORMATION AND MAINTENANCE IN A HIGH AVAILABILITY CLUSTER CONFIGURATION in which an administrator identifies a set of resources that must be collocated with a given application for failover purposes and based on that definition, one or more resource groups are automatically generated.

BRIEF SUMMARY OF THE INVENTION

In an embodiment of the invention, a method for dynamically creating of a high availability policy based upon entries in a configuration management database (CMDB) and a best practices template can be provided. The method can include directing resource discovery in a CMDB for a selected application to discover components and dependencies of the selected application. In doing so, the knowledge of what actually exists in the customer computing environment can be realized. The method also can include mapping the components and dependencies discovered for the selected application in the CMDB to a best practices template specifying a parameterized high availability topology for the selected application. Finally, the method can include storing the best practices template with mapped components and dependencies as a high availability policy for the selected application.

In an aspect of the embodiment, the method yet further can include deploying the selected application in selected hosts in a high availability cluster according to the stored high availability policy. In this regard, deploying the selected application in selected hosts in a high availability cluster according to the stored high availability policy can include directing resource discovery in the CMDB to discover available failover hosts in a high availability cluster and specifying a failover configuration for the selected application. Thereafter, components and dependencies of the selected application can be provisioned to the available failover hosts in the high availability cluster in accordance with the specified failover configuration. Finally, the CMDB can be updated to reflect the provisioning of the components and dependencies of the selected application in the high availability cluster.

In another aspect of the embodiment, a change can be detected in an underlying computing environment for the high availability cluster. Consequently, the directing of resource discovery in the CMDB for the selected application, the mapping of the components and dependencies to the best practices template and the storing of the best practices template with mapped components and dependencies as a high availability policy for the selected application can be repeated to account for the change in the underlying computing environment. In this way, the impact of the change in the underlying computing environment upon the existing high availability policy can be analyzed.

In another embodiment of the invention, a high availability policy creation and deployment data processing system can be configured for the dynamic creation of a high availability policy based upon entries in a CMDB and a best practices template. The system can include a host server configured for communicative coupling to a CMDB over a computer communications network, and a high availability policy generation module executing in the host server. The high availability policy generation module can include program code enabled to direct resource discovery in the CMDB for a selected application to discover components and dependencies of the selected application, to map the components and dependencies discovered for the selected application in the CMDB to a best practices template specifying a parameterized high availability topology for the selected application, and to store the best practices template with mapped components and dependencies as a high availability policy for the selected application.

In one aspect of the embodiment, the system also can include a high availability policy deployment module executing in the host server. The high availability policy deployment module can include program code enabled to deploy the selected application in selected hosts in a high availability cluster coupled to the host server according to the stored high availability policy.

In this way, an administrator charged with rendering an application to be highly available can be relieved from understanding the infrastructure components such as server, storage, and network applications in the computing environment and the operational dependencies of the application. Rather, the infrastructure components of the computing environment can be automatically discovered and the dependencies of the application can be obtained from the CMDB. While past efforts in rendering an application for high availability merely addressed the collocation requirements of resources, which is not sufficient for a highly available configuration. In the embodiments of the invention described herein, the best practices templates provide the additional functionality for a complete high availability policy.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention.

DETAILED DESCRIPTION OF THE INVENTION

Figure 1:
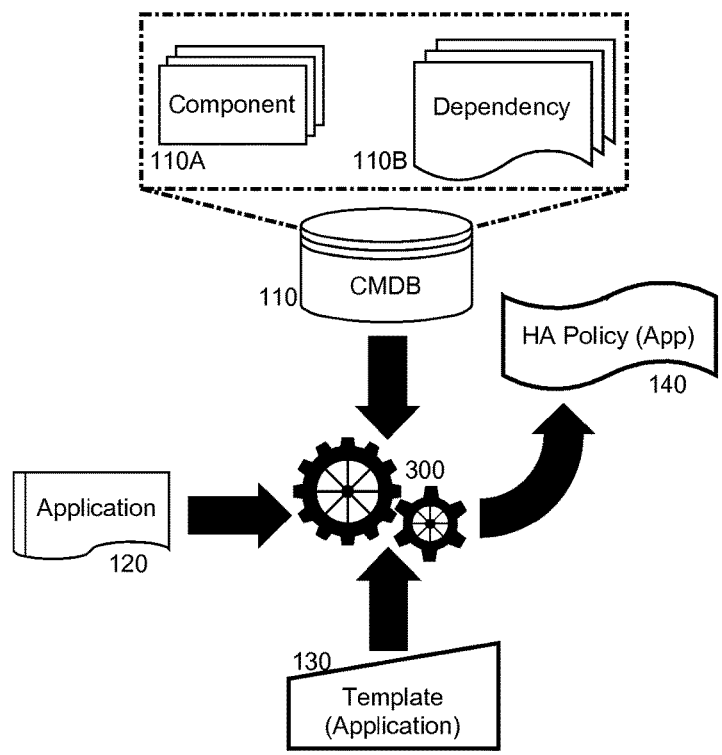
FIG. 1 is a pictorial illustration of a process for the dynamic creation of a high availability policy based upon entries in a CMDB and a best practices template.

As will be appreciated by one skilled in the art, the present invention may be embodied as a method, data processing system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Embodiments of the present invention provide a method, system and computer program product for the dynamic creation of a high availability policy based upon entries in a CMDB and a best practices template. In accordance with an embodiment of the present invention, an application can be selected by way of a user interface to a high availability policy creation and deployment data processing system. A CMDB can be accessed to discover configuration items (CIs) relating to components for the selected application and dependency relationships there between. Also, a best practices template can be retrieved in association with the selected application for a high availability configuration of the selected application. In this regard, the best practices template can specify a proven topology for deploying a highly available form of the selected application. Notably, the discovered CIs can be mapped to entries in the template.

Subsequently, the template can be transformed into a high availability policy for the selected application and applied to dependency information obtained from the CMDB in connection with the selected application in order to support a deployment of a highly available configuration of the selected application.

In further illustration, FIG. 1 pictorially shows a process for the dynamic creation of a high availability policy based upon entries in a CMDB and a best practices template. As shown in FIG. 1, a CMDB 110 can include CIs referencing both components 110A for different applications and dependency relationships for requisite executing process thereof. A high availability policy creation and deployment data processing system 300 can invoke discovery in the CMDB 110 to locate CIs for components 110A and the dependencies 110B of the selected application 120 in a supporting computing environment, and to map the components 110A and the dependencies 110B to entries in a high availability template 130 corresponding to the selected application 120. Specifically, the high availability template 130 can specify in a structured document such as a markup language document a known arrangement of components for an application or application type in order to render the application highly available.

Configuration data for the selected application 120, such as network address information, and a file system mount point for each of the components 110A and dependencies 110B, also can be mapped to entries in the high availability template 130. Once the components 110A and the dependencies 110B (and the configuration data) have been mapped to entries in the high availability template 130, the template 130 can be stored as a high availability policy 140 for the selected application 120. Thereafter, the high availability policy 140 for the selected application 120 can be deployed by applying entries of the high availability policy 140 to the supporting computing environment and reflecting the application of the high availability policy 140 within the CMDB 110 during resource discovery.

Figure 2:
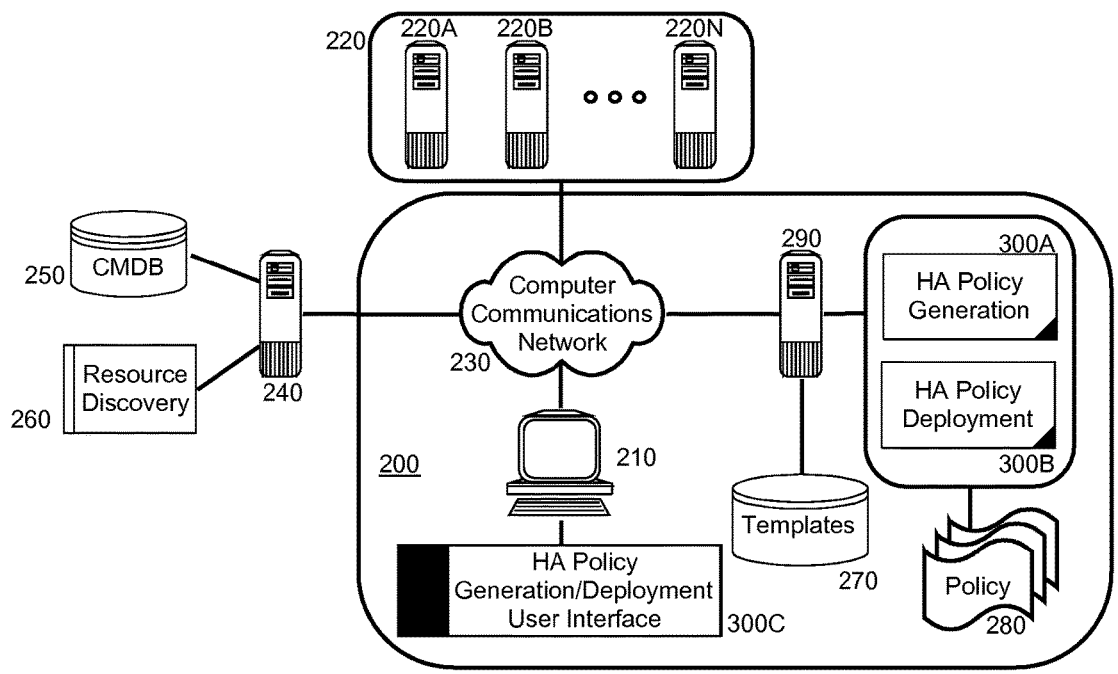
FIG. 2 is a schematic illustration of a high availability policy creation and deployment data processing system configured for the dynamic creation of a high availability policy based upon entries in a CMDB and a best practices template; and, FIGS. 3A and 3B, taken together, are a flow chart illustrating a process for the dynamic creation and deployment of a high availability policy based upon entries in a CMDB and a best practices template.

The process described in connection with FIG. 1 can be embodied within a high availability policy creation and deployment data processing system. Illustratively, FIG. 2 schematically shows a high availability policy creation and deployment data processing system 200 configured for the dynamic creation of a high availability policy based upon entries in a CMDB and a best practices template. The system can include a host computing platform 210 configured for communicative coupling to a host server 290 over computer communications network 230. The host server 290 can support the operation of both a high availability policy generation module 300A and a high availability policy deployment module 300B, both configured for access by an end user through a user interface 300C rendered in the host computing platform 210. Additionally, the host server 200 can be configured for communicative coupling over the computer communications network 230 to a server 240 supporting a CMDB 250 and corresponding resource discovery logic 260 acting as an interface to the CMDB 250.

The high availability policy generation module 300A can include program code enabled to direct the discovery of components and dependencies by the resource discovery logic 260 in the CMDB for an application selected through the user interface 300C. The program code of the high availability policy generation module 300A further can be enabled select a best practices template in a data store of templates 270 to map the discovered components and dependencies to entries in a best practices template for the selected application.

In particular, the best practices template can be a structured markup language document such as an extensible markup language (XML) formatted document with different entries specifying a known topology for rendering an application highly available. As such, the best practices template is a best practice model of how an application or component can be made highly available. A generic form of the best practices template can be established to address many high availability configurations including the processes that must concurrently execute in support of an application or component, the network address that must to be available for clients of the application or component, and the file system mount point that must be available for the application or component to properly function.

Specifically, the best practices template can include parameterized entries that can be completed by mapping the discovered components and dependencies of a selected application to different ones of the parameterized entries in order to create an application specific high availability policy 280. For instance, the parameterized entries of the best practices template can enumerate different hosts, each as a resource group, to host different portions of the components and dependencies at a parameterized network address with a parameterized particular file system mount point. The parameterized entries of the best practices template also can specify a start/stop/monitor default script for each of the components and dependencies in each of the resource groups.

An application specific high availability policy 280 includes the definition of the resource groups with actual discovered values for processes, mount points and network addresses (associated with network cards) and default associated start/stop/monitor scripts for each subcomponent. Thus, the high availability policy can provide a completed form of the template with the parameterized entries replaced with specific entries particular to a selected application, including a network address and file system mount point to be used when deploying the application specific high availability policy 280. An exemplary high availability policy could be representative of the following high availability configuration:

```
<?xml version="1.0" encoding="UTF-8" ?>
<HAPolicy productID="xxx" version="x.x.x"
xmlns="http://www.ibm.com/TSA/Policy.xsd"
xmlns:xsi="http://www.w3.org/2001/XMLSchema-instance"
xsi:schemaLocation="http://www.ibm.com/TSA/Policy.xsd
SAMPolicyTemplate.xsd">
- <PolicyInformation>
  <PolicyName>template</PolicyName>
  <AutomationDomainName>%%domain_name%%
  </AutomationDomainName>
  <PolicyToken>1.0</PolicyToken>
  <PolicyDescription>this is a top-level template policy
  </PolicyDescription>
  <PolicyAuthor>admin</PolicyAuthor>
</PolicyInformation>
  <var name="domain_name" value="myDomain" />
  <var name="hostname1" value="node1" />
  <var name="hostname2" value="node2" />
  <var name="network_tiebreaker_IP_address" value="1.23.45.100" />
  <var name="name_prefix" value="tsa" />
  <var name="ip_address" value="1.23.45.110" />
  <var name="ip_mask" value="255.255.255.0" />
  <var name="receive_port" value="199" />
  <var name="network_interface1" value="eth0" />
  <var name="network_interface2" value="eth1" />
```

-continued

```
  <var name="control_script1" value="/usr/bin/policies/ctrl1" />
  <var name="control_script2" value="/usr/bin/policies/ctrl2" />
  <include>application1-policy.xml</include>
  <include>application2-policy.xml</include>
</HAPolicy>
```

The high availability policy deployment module 300B, in turn, can include program code enabled to load a high availability policy 280 for a selected application, and to identify by way of the CMDB 250 one or more host systems 220A, 220B, 220N in a high availability cluster 220 to which the components of the selected application are to be deployed in accordance with the loaded high availability policy 280. Different arrangements of the host systems 220A, 220B, 220N in the high availability cluster 220 can be selected, such as 1:1, 1:n and n:n, according to a desired failover configuration specified through the user interface 300C. Subsequently, the components of the selected application can be provisioned to the selected host systems 220A, 220B, 220N according to the desired failover configuration and the CMDB 250 can be updated to reflect the deployment of the selected application in the high availability cluster 220.

Figure 3A:
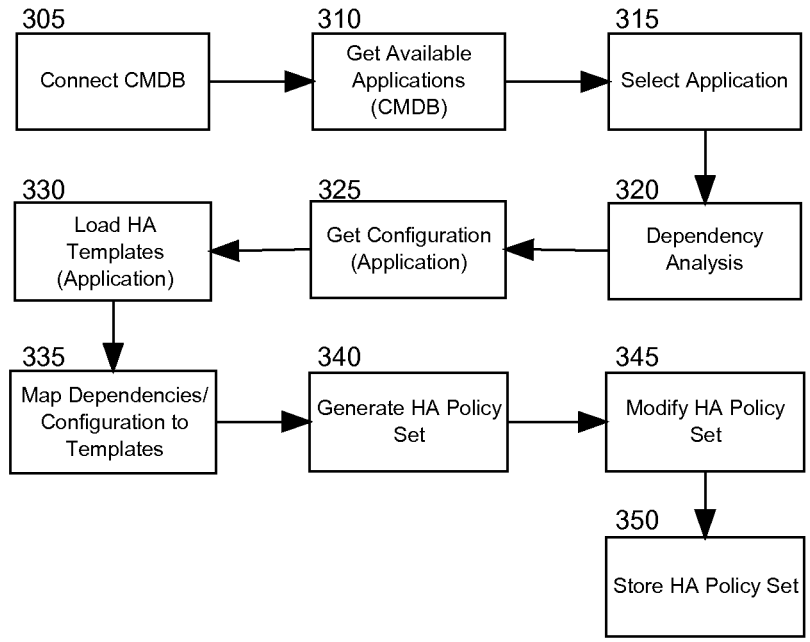
Figure 3B:
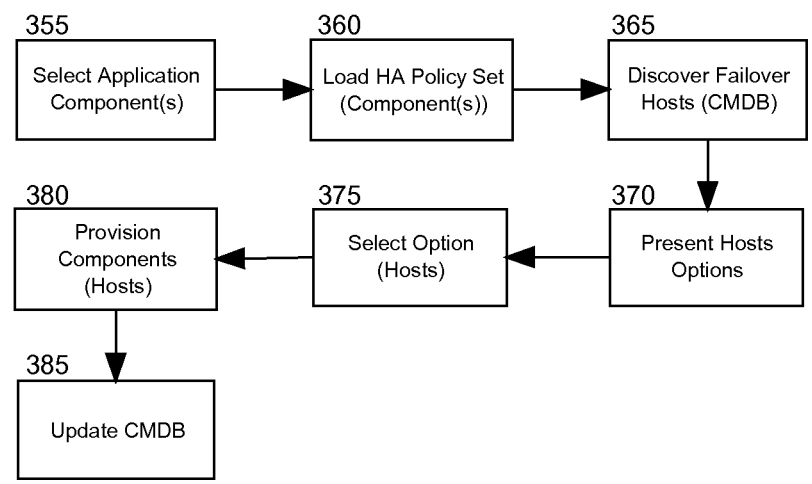

In yet further illustration of the operation of the high availability policy creation and deployment data processing system 200, FIGS. 3A and 3B, taken together, are a flow chart illustrating a process for the dynamic creation and deployment of a high availability policy based upon entries in a CMDB and a best practices template. Beginning in block 305 of FIG. 3A, a communicative connection can be established with a CMDB and a list of available applications referenced by the CMDB can be determined in block 310. In block 315, a particular one of the applications can be selected and in block 320, a dependency analysis can be conducted for the selected application by way of resource discovery of the components and dependencies thereof in the CMDB. For example, the dependencies can include sub-components of the application for instance, application servers, database servers, directory services and the like, required by the application. Likewise, in block 325, a configuration for the selected application can be acquired, including requisite network address and file system mount point for each dependency of the selected application.

In block 330, one or more high availability templates can be loaded for the selected application according to the discovered components and dependencies of the selected application. For instance, one template may refer to a dependency upon a database management system, while another template may refer to a dependency upon a Web server. In block 335, the components and dependencies determined during the dependency analysis can be mapped to parameterized entries in the high availability template or templates to create a high availability policy set for the selected application in block 340. Optionally, in block 345, the high availability policy set can be modified through end user interactions. Finally, in block 350, the high availability policy set can be stored for subsequent retrieval when implementing the high availability policy in a high availability cluster. Of note, as the underlying computing environment for the high availability cluster changes, the process of FIG. 3A can be repeated to produce a new high availability policy for a selected application.

Turning now to FIG. 3B, in block 355, one or more application components for a selected application can be selected for deployment to a high availability cluster. In block 360, a high availability policy set can be loaded for the selected application. In block 365, availability failover hosts can be discovered in the high availability cluster through resource discovery in the CMDB. In block 370, a set of options for different high availability configurations in the high availability cluster based upon available failover hosts can be presented to the end user and selected by the end user. In block 380, the components of the selected application can be provisioned to the hosts selected by the end user according to the high availability policy for the selected application. Finally, in block 385, the CMDB can be updated to reflect the deployment of the selected application in a high availability configuration in the high availability cluster.

Having thus described the invention of the present application in detail and by reference to embodiments thereof, it will be apparent that modifications and variations are possible without departing from the scope of the invention defined in the appended claims.

We claim:

1. A method for dynamically creating a high availability policy based upon entries in a configuration management database (CMDB) and a best practices template, the method comprising:
   displaying in a computer, a user interface through which an application is selected for high availability configuration;
   directing resource discovery in a CMDB for the selected application to discover components and dependencies of the selected application, the resource discovery processing different configuration items (CIs) in the CMDB in order to identify the components and dependencies of the selected application;
   selecting a best practices template from amongst other templates in a data store, the best practices template comprising a structured markup language document with different entries of the document specifying a parameterized high availability topology for the selected application that has been proven as a topology of a known arrangement of components of another application in order to deploy a highly available form of the other application including an arrangement directed to a concurrent execution of processes, an arrangement directed to an available network address and a file system mount point that must be available for a component of the other application to properly function;
   mapping the components and dependencies discovered for the selected application in the CMDB to the best practices template; and,
   storing the best practices template with mapped components and dependencies as a high availability policy for the selected application, the policy comprising parameterized entries of the template replaced with specific entries particular to the selected application, including a network address and file system mount point to be used when deploying the high availability policy.

2. The method of claim 1, further comprising deploying the selected application in selected hosts in a high availability cluster according to the stored high availability policy.

3. The method of claim 2, wherein deploying the selected application in selected hosts in a high availability cluster according to the stored high availability policy, comprises:
   directing resource discovery in the CMDB to discover available failover hosts in a high availability cluster;
   specifying a failover configuration for the selected application;
   provisioning components and dependencies of the selected application to the available failover hosts in the high availability cluster in accordance with the specified failover configuration; and,
   updating the CMDB to reflect the provisioning of the components and dependencies of the selected application in the high availability cluster.

4. The method of claim 1, further comprising:
   detecting a change in an underlying computing environment for the high availability cluster; and,
   repeating the directing, mapping and storing to account for the change in the underlying computing environment.

5. The method of claim 1, wherein mapping the components and dependencies discovered for the selected application in the CMDB to a best practices template specifying a parameterized high availability topology for the selected application, comprises mapping the components and dependencies discovered for the selected application in the CMDB to a best practices template specifying a parameterized high availability topology selected from the group consisting of 1:1, 1:n and n:n.

6. A high availability policy creation and deployment data processing system configured for the dynamic creation of a high availability policy based upon entries in a configuration management database (CMDB) and a best practices template, the system comprising:
   a host server configured for communicative coupling to a CMDB over a computer communications network; and,
   a high availability policy generation module executing in the host server, the high availability policy generation module comprising program code enabled to display a user interface through which an application is selected for high availability configuration, to direct resource discovery in the CMDB for the selected application to discover components and dependencies of the selected application, the resource discovery processing different configuration items (CIs) in the CMDB in order to identify the components and dependencies of the selected application, to select a best practices template from amongst other templates in a data store, the best practices template comprising a structured markup language document with different entries of the document specifying a parameterized high availability topology for the selected application that has been proven as a topology of a known arrangement of components of another application in order to deploy a highly available form of the other application including an arrangement directed to a concurrent execution of processes, an arrangement directed to an available network address and a file system mount point that must be available for a component of the other application to properly function, to map the components and dependencies discovered for the selected application in the CMDB to the best practices template, and to store the best practices template with mapped components and dependencies as a high availability policy for the selected application, the policy comprising parameterized entries of the template replaced with specific entries particular to the selected application, including a network address and file system mount point to be used when deploying the high availability policy.

7. The system of claim 6, further comprising a high availability policy deployment module executing in the host server, the high availability policy deployment module comprising program code enabled to deploy the selected application in selected hosts in a high availability cluster coupled to the host server according to the stored high availability policy.

8. A computer program product for dynamically creating a high availability policy based upon entries in a configuration management database (CMDB) and a best practices template, the computer program product comprising:
  a computer usable storage memory device storing computer usable program code embodied therewith, the computer usable program code comprising:
  computer usable program code for displaying in a computer, a user interface through which an application is selected for high availability configuration;
  computer usable program code for directing resource discovery in a CMDB for the selected application to discover components and dependencies of the selected application, the resource discovery processing different configuration items (CIs) in the CMDB in order to identify the components and dependencies of the selected application;
  computer usable program code for selecting a best practices template from amongst other templates in a data store, the best practices template comprising a structured markup language document with different entries of the document specifying a parameterized high availability topology for the selected application that has been proven as a topology of a known arrangement of components of another application in order to deploy a highly available form of the other application including an arrangement directed to a concurrent execution of processes, an arrangement directed to an available network address and a file system mount point that must be available for a component of the other application to properly function;
  computer usable program code for mapping the components and dependencies discovered for the selected application in the CMDB to the best practices template; and,
  computer usable program code for storing the best practices template with mapped components and dependencies as a high availability policy for the selected application, the policy comprising parameterized entries of the template replaced with specific entries particular to the selected application, including a network address and file system mount point to be used when deploying the high availability policy.

9. The computer program product of claim 8, further comprising computer usable program code for deploying the selected application in selected hosts in a high availability cluster according to the stored high availability policy.

10. The computer program product of claim 9, wherein the computer usable program code for deploying the selected application in selected hosts in a high availability cluster according to the stored high availability policy, comprises:
  computer usable program code for directing resource discovery in the CMDB to discover available failover hosts in a high availability cluster;
  computer usable program code for specifying a failover configuration for the selected application;
  computer usable program code for provisioning components and dependencies of the selected application to the available failover hosts in the high availability cluster in accordance with the specified failover configuration; and,
  computer usable program code for updating the CMDB to reflect the provisioning of the components and dependencies of the selected application in the high availability cluster.

11. The computer program product of claim 8, further comprising:
  computer usable program code for detecting a change in an underlying computing environment for the high availability cluster; and,
  computer usable program code for repeating the directing, mapping and storing to account for the change in the underlying computing environment.

12. The computer program product of claim 8, wherein the computer usable program code for mapping the components and dependencies discovered for the selected application in the CMDB to a best practices template specifying a parameterized high availability topology for the selected application, comprises computer usable program code for mapping the components and dependencies discovered for the selected application in the CMDB to a best practices template specifying a parameterized high availability topology selected from the group consisting of 1:1, 1:n and n:n.

* * * * *